US011370318B2

(12) United States Patent
Imai et al.

(10) Patent No.: US 11,370,318 B2
(45) Date of Patent: Jun. 28, 2022

(54) ELECTRIC VEHICLE SUPPORT SYSTEM

(71) Applicant: HONDA MOTOR CO., LTD., Tokyo (JP)

(72) Inventors: Naoko Imai, Wako (JP); Atsuyuki Suzuki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 540 days.

(21) Appl. No.: 16/439,819

(22) Filed: Jun. 13, 2019

(65) Prior Publication Data

US 2020/0001736 A1   Jan. 2, 2020

(30) Foreign Application Priority Data

Jul. 2, 2018  (JP) .............................. JP2018-125848

(51) Int. Cl.
| | |
|---|---|
| *B60L 53/66* | (2019.01) |
| *B60L 58/12* | (2019.01) |
| *G07C 9/00* | (2020.01) |
| *B60R 25/24* | (2013.01) |
| *G07C 5/00* | (2006.01) |

(52) U.S. Cl.
CPC ............... *B60L 53/66* (2019.02); *B60L 58/12* (2019.02); *B60R 25/24* (2013.01); *G07C 5/008* (2013.01); *G07C 9/00309* (2013.01); *G07C 2009/00412* (2013.01)

(58) Field of Classification Search
CPC .......... B60L 53/66; B60L 58/12; B60R 25/24; G07C 5/008; G07C 9/00309; G07C 2009/00412
See application file for complete search history.

(56) References Cited

U.S. PATENT DOCUMENTS

| | | | | |
|---|---|---|---|---|
| 2008/0243330 | A1* | 10/2008 | Kato | ............................... 701/30 |
| 2013/0257344 | A1* | 10/2013 | Millet | ................... H02J 7/0054 |
| | | | | 320/104 |
| 2014/0035526 | A1* | 2/2014 | Tripathi | .............. B60L 11/1838 |
| | | | | 320/109 |
| 2014/0088827 | A1* | 3/2014 | Yashiro | ................. B60R 16/033 |
| | | | | 701/36 |

(Continued)

FOREIGN PATENT DOCUMENTS

JP    2007-093377    4/2007

OTHER PUBLICATIONS

Japanese Office Action with English translation dated Oct. 26, 2021, 7 pages.

*Primary Examiner* — Elaine Gort
*Assistant Examiner* — Anthony M Gartrelle
(74) *Attorney, Agent, or Firm* — Rankin, Hill & Clark LLP (57) ABSTRACT

A vehicle non-use state recognition unit recognizes that an electric vehicle 1 is in non-use state. A battery remaining amount recognition unit recognizes a remaining amount of a battery loaded into the electric vehicle. A battery maintenance request unit transmits, when the vehicle non-use state recognition unit recognizes that the electric vehicle is in non-use state, remaining amount recovery request information for requesting to recover the remaining amount of the battery to a maintenance server which receives a maintenance of the battery when the battery remaining amount recognition unit recognizes that the remaining amount of the battery is a first predetermined value or less.

6 Claims, 4 Drawing Sheets

(56) References Cited

U.S. PATENT DOCUMENTS

| | | | |
|---|---|---|---|
| 2016/0321740 A1 | 11/2016 | Hill | |
| 2017/0369010 A1* | 12/2017 | Tarte | B60R 16/0236 |
| 2019/0184939 A1* | 6/2019 | Hioki | B60R 25/241 |
| 2020/0122600 A1* | 4/2020 | Yamamoto | B60L 58/10 |

* cited by examiner

| USER ID (201a) | VEHICLE INFORMATION (201b) | ELECTRONIC KEY (201c) | BATTERY REMAINING AMOUNT THRESHOLD VALUE (201d) | VEHICLE NON-USE PERIOD (201e) | ... |
|---|---|---|---|---|---|
| Pt-001 | CARIF-A [VEHICLE ID - VEHICLE TYPE - COLOR - ...] | Vk-001 | Btth_A | Cuup_A | ... |
| Pt-002 | CARIF-B | Vk-002 | Btth_B | Cuup_B | ... |
| Pt-003 | CARIF-C | Vk-003 | Btth_C | Cuup_C | ... |
| Pt-004 | CARIF-D | Vk-004 | Btth_D | Cuup_D | ... |
| ... | ... | ... | ... | ... | ... |

ELECTRIC VEHICLE SUPPORT SYSTEM

INCORPORATION BY REFERENCE

The present application claims priority under 35 U.S.C. § 119 to Japanese Patent Application No. 2018-125848 filed on Jul. 2, 2018. The content of the application is incorporated herein by reference in its entirety.

BACKGROUND OF THE INVENTION

Field of the Invention

The present invention relates to an electric vehicle support system.

Description of the Related Art

Conventionally, in a vehicle which travels using fuel such as gasoline as an energy source, a navigation device which supports, when a remaining amount of the fuel becomes a predetermined amount or less while the vehicle is traveling, replenishment of fuel has been proposed (see, for example, Japanese Patent Laid-Open No. 2007-93377). The navigation device described in Japanese Patent Laid-Open No. 2007-93377 determines, when the remaining amount of the fuel becomes the predetermined amount or less while the vehicle is traveling, whether or not the vehicle can travel to a nearest gas station, and guides, when the vehicle cannot travel to the nearest gas station, the vehicle to a road shoulder to request to supply fuel.

A vehicle using fuel as an energy source may run out of the fuel while traveling, as described above. However, the vehicle may not run out of the fuel when it remains parked in a parking lot for a long period. On the other hand, an electric vehicle using a battery as an energy source may be unable to self-travel due to natural discharge when it remains parked in a parking lot for a long period.

SUMMARY OF THE INVENTION

The present invention has been made in view of such a background, and is directed to providing an electric vehicle support system capable of preventing an electric vehicle from being unable to self-travel due to a decrease in a remaining amount of a battery.

An electric vehicle support system according to an aspect of the present invention includes a vehicle non-use state recognition unit which recognizes that an electric vehicle is in non-use state, a battery remaining amount recognition unit which recognizes a remaining amount of a battery loaded into the electric vehicle, and a battery maintenance request unit which transmits, when the vehicle non-use state recognition unit recognizes that the electric vehicle is in non-use state, remaining amount recovery request information for requesting to recover the remaining amount of the battery to a maintenance reception communication terminal which receives a maintenance of the battery when the battery remaining amount recognition unit recognizes that the remaining amount of the battery is a first predetermined value or less.

The electric vehicle support system may be configured such that the battery maintenance request unit transmits an electronic key which enables an operation of the electric vehicle to the maintenance reception communication terminal when transmitting the remaining amount recovery request information to the maintenance reception communication terminal.

The electric vehicle support system may be configured to further include an electronic key use recognition unit which recognizes that the electric vehicle is in an electronic key use state where the electric vehicle is started by using the electronic key and the electric vehicle is operating, and an electronic key enabled service execution unit which executes at least either one of a first service for supporting an operation of the electric vehicle for a commissioned staff who is operating the electric vehicle and a second service for notifying a user of the electric vehicle of a state of the electric vehicle when the electronic key use recognition unit recognizes that the electric vehicle is in the electronic key use state.

The electric vehicle support system may be configured to further include a traveling history recording unit which records a traveling history of the electric vehicle when the electronic key use recognition unit recognizes that the electric vehicle is in the electronic key use state, the electronic key enabled service execution unit performing processing for transmitting information about the traveling history of the electric vehicle in the electronic key use state recorded by the traveling history recording unit to a communication terminal of a user of the electric vehicle as the second service.

The electric vehicle support system may be configured to further include a charging station search unit which searches for a nearest charging station as a charging station nearest from a current position of the electric vehicle, the electronic key enabled service execution unit performing a route guidance to the nearest charging station searched for by the charging station search unit as the first service.

The electric vehicle support system may be configured to include a charging station reach recognition unit which recognizes that the electric vehicle has reached a charging station, the electronic key enabled service execution unit performing processing for exposing, when the charging station reach recognition unit recognizes that the electric vehicle has reached the charging station, a charging port of the electric vehicle as the first service.

The electric vehicle support system may be configured such that the electronic key enabled service execution unit performs processing for transmitting, when the battery remaining amount recognition unit recognizes that the remaining amount of the battery is not less than a second predetermined value larger than the first predetermined value, charging completion information for notifying completion of charging of the battery to the communication terminal of the user of the electric vehicle as the second service.

The electric vehicle support system may be configured to further include an electric vehicle return recognition unit which recognizes that the electric vehicle starts to travel in the electronic key use state and then returns to a place where the traveling is started, the electronic key enabled service execution unit performing processing for transmitting, when the electric vehicle return recognition unit recognizes that the electric vehicle starts to travel in the electronic key use state and then returns to the place where the traveling is started and the battery remaining amount recognition unit recognizes that a remaining amount of the battery is not less than a third predetermined value larger than the first predetermined value, charging completion return information for notifying completion of charging of the battery and the return of the electric vehicle to a communication terminal of the user of the electric vehicle as the second service.

In the electric vehicle support system according to the aspect of the present invention, when the vehicle non-use state recognition unit recognizes that the electric vehicle is in non-use state, and the battery remaining amount recognition unit recognizes that the remaining amount of the battery is the first predetermined value or less, the battery maintenance request unit transmits the remaining amount recovery request information for requesting to recover the remaining amount of the battery to the maintenance reception communication terminal. As a result, the commissioned staff, for example, who has confirmed the remaining amount recovery request information by the notification from the maintenance reception communication terminal can recover the remaining amount of the battery by taking a countermeasure, for example, to come to a parking lot of the electric vehicle to charge the battery, deliver a battery which has already been charged to the parking lot of the electric vehicle, or drive the electric vehicle to the charging station to charge the battery and return the electric vehicle to the original parking lot. Accordingly, the electric vehicle can be prevented from being unable to self-travel due to discharge of the battery.

DETAILED DESCRIPTION OF THE PREFERRED EMBODIMENTS

1. Service of Commissioned Battery Charging

Figure 1:
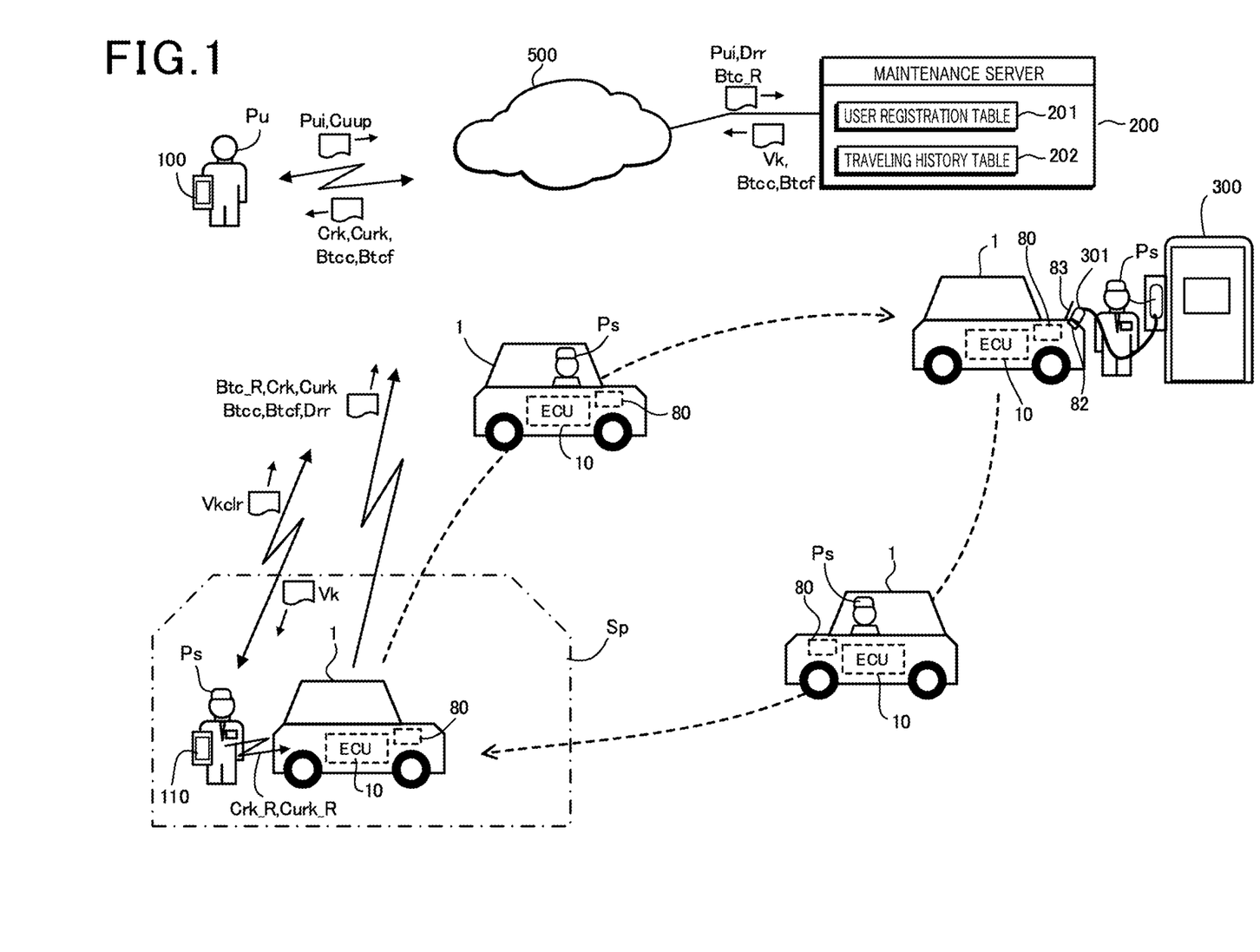
FIG. 1 is an explanatory diagram of a service of commissioned battery charging using an electric vehicle support system.

FIG. 1 is an explanatory diagram of a service of commissioned battery charging in the present embodiment. In the present embodiment, an electric vehicle support system according to the embodiment of the present invention is configured as apart of a function of an ECU (electronic control unit) 10 loaded into an electric vehicle 1.

The electric vehicle 1 is an EV (electric vehicle) or a PHV (plug-in hybrid vehicle) which travels using a battery 80 as a driving source, and is connected to an external charger such as a charging station 300, to charge the battery 80. The electric vehicle 1 communicates with a communication terminal 100 of a user Pu of the electric vehicle 1 who uses a service of commissioned charging (hereinafter referred to as a user communication terminal 100), a communication terminal 110 of a commissioned staff Ps who takes charge of the service of commissioned charging (hereinafter referred to as a staff communication terminal 110), and a maintenance server 200 via a communication network 500.

A configuration in which the maintenance server 200 receives the service of commissioned charging of the battery 80 in the electric vehicle 1 corresponds to a maintenance reception communication terminal according to the present invention. Examples of the user Pu of the electric vehicle 1 include an owner of the electric vehicle 1, a person, who routinely uses the electric vehicle 1, such as a family or a housemate of the owner, and a person who borrows the electric vehicle 1 from the owner.

The electric vehicle 1 directly communicates with the staff communication terminal 110, to receive an instruction to unlock and lock the electric vehicle 1 with an electronic key Vk. Examples of the user communication terminal 100 and the staff communication terminal 110 which are used include a smartphone, a mobile phone, and a tablet terminal.

The user Pu accesses the maintenance server 200 using the user communication terminal 100 and transmits user information Pui, to register use of the service of commissioned charging. The user information Pui includes a profile of the user Pu, information about the electric vehicle 1, and the like. The maintenance server 200 issues a user ID (identification) as identification information of the user Pu by receiving the user information Pui, and records the issued user ID in association with information recognized from the user information Pui in a user registration table 201.

The maintenance server 200 receives vehicle non-use period information Cuup representing a vehicle non-use period as a period during which the user Pu does not use the electric vehicle 1 from the user communication terminal 100. The maintenance server 200 records the vehicle non-use period information Cuup in association with the user ID in the user registration table 201.

Figure 3:
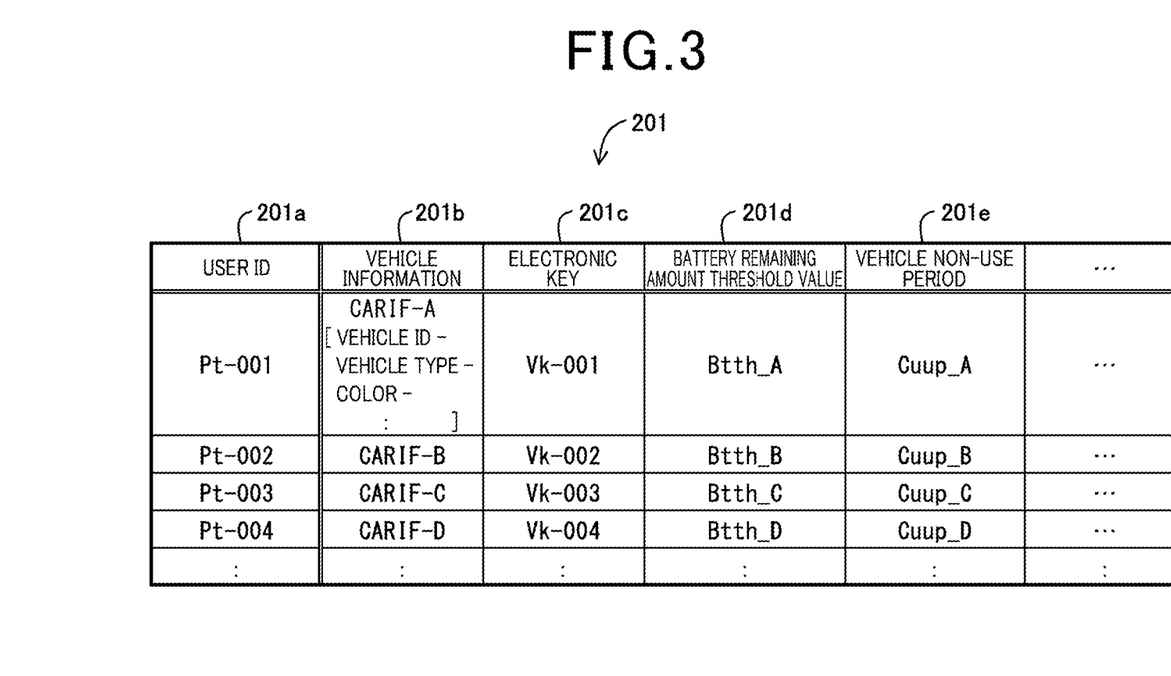
FIG. 3 is an explanatory diagram of a user registration table.

As illustrated in FIG. 3, in the user registration table 201, information such as vehicle information 201$b$ (including an ID for communication, a vehicle type, a color, a parking lot, and the like of an electric vehicle), an electronic key 201$c$, a battery remaining amount threshold value 201$d$ for determining a battery charging period, and a vehicle non-use period 201$e$ are recorded in association with a user ID 201$a$ of each of users. For example, vehicle information CARIF-A, an electronic key Vk-001, a battery remaining amount threshold value Btth-A, and a vehicle non-use period Cuup-A are recorded in association with a user ID Pt-001.

The ECU 10 in the electric vehicle 1 monitors a remaining amount of the battery 80 when the electric vehicle 1 is parked in a parking lot Sp. When the remaining amount of the battery 80 becomes a remaining amount threshold value (corresponding to a first predetermined value in the present invention) or less due to natural discharge by non-use for a long period of the electric vehicle 1, for example, the ECU 10 transmits to the maintenance server 200 charging request information Btc-R for requesting to charge the battery 80 (corresponding to remaining amount recovery request information in the present invention).

The maintenance server 200 transmits, when it receives the charging request information Btc_R, the electronic key Vk for enabling an operation of the electric vehicle 1 to the staff communication terminal 110 at a timing of the vehicle non-use period of the electric vehicle 1, to issue an instruction to perform a commissioned charging for the electric vehicle 1.

The commissioned staff Ps acquires information about the electric vehicle 1 (a parking lot, a vehicle type, a color, etc.) from the maintenance server 200, to come to the parking lot Sp of the electric vehicle 1. In the parking lot Sp, the commissioned staff Ps performs authentication with the electronic key Vk received by the staff communication terminal 110, and transmits unlocking request information Curk_R to the electric vehicle 1 to unlock the electric vehicle 1. The commissioned staff Ps drives the electric vehicle 1 toward a nearest charging station 300 as a charging station nearest from the parking lot Sp.

The ECU 10 in the electric vehicle 1 opens, when it recognizes that the electric vehicle 1 has reached the nearest charging station 300, a charging lid 83 of a charging port 82. The commissioned staff Ps connects a charging plug 301 to the charging port 82 in the electric vehicle 1, to charge the battery 80. When the charging of the battery 80 is completed, the commissioned staff Ps drives the electric vehicle 1 again, to return to the original parking lot Sp. The ECU 10 in the electric vehicle 1 transmits charging completion information Btcc for notifying the completion of the charging of the battery 80 to the user communication terminal 100 via the maintenance server 200.

The commissioned staff Ps who has returned to the parking lot Sp performs authentication with the electronic key Vk stored in the staff communication terminal 110, and transmits locking request information Crk_R to the electric vehicle 1, to lock the electric vehicle 1. The ECU 10 in the electric vehicle 1 transmits charging completion return information Btcf for notifying that the electric vehicle 1 has returned to the original parking lot Sp upon completing the charging of the battery 80 and vehicle locking information Crk for notifying that the electric vehicle 1 has been locked to the user communication terminal 100 via the maintenance server 200.

The user Pu can recognize that the charging of the battery 80 in the electric vehicle 1 by the service of commissioned charging has been completed by confirming the vehicle locking information Crk and the charging completion return information Btcf using the user communication terminal 100.

The maintenance server 200 receives traveling history information Drr of the electric vehicle 1 by the service of commissioned charging transmitted from the electric vehicle 1, and records the received traveling history information Drr in a traveling history table 202. The user Pu can refer to a traveling history of the electric vehicle 1 by the service of commissioned charging by accessing the maintenance server 200 using the user communication terminal 100. As a result, the user Pu can confirm whether or not the traveling of the electric vehicle 1 by the service of commissioned charging has been appropriate.

2. Configuration of Electric Vehicle

Then, a configuration of the electric vehicle 1 will be described with reference to FIG. 2. The ECU 10 loaded into the electric vehicle 1 is configured to have a function of the electric vehicle support system according to the present invention. The ECU 10 is connected to be communicable with a door lock mechanism 50 which locks and unlocks a door (a trunk or a door) of the electric vehicle 1, a door lock sensor 51 which detects locked and unlocked states of the door, a speed sensor 52 which detects a speed of the electric vehicle 1, an acceleration sensor 53 which detects an acceleration of the electric vehicle 1, an angular velocity sensor 54 which detects an angular velocity of the electric vehicle 1, a battery voltage sensor 55 which detects a voltage of the battery 80, a navigation unit 60, a communication unit 70, a charger 81, and a charging lid opener 84 via a CAN (controller area network) 5.

The navigation unit 60 includes a GPS receiver 61 which receives a signal transmitted from a GPS (global positioning system) satellite and detects a current position (latitude and longitude) of the electric vehicle 1 and map data 62 stored in a memory (not illustrated). The navigation unit 60 performs a route guidance to a destination based on the current position of the electric vehicle 1 detected by the GPS receiver 61 and the map data 62.

The communication unit 70 includes a short range wireless communication unit 71 and a TCU (telematics communication unit) 72. The short range wireless communication unit 71 performs short range wireless communication with the user communication terminal 100 and the staff communication terminal 110 in conformity with a communication standard such as BR/EDR (Bluetooth Basic Rate/Enhanced Data Rate; Bluetooth is registered trademark), BLE (Bluetooth Low Energy), NFC (Near Field Communication), or Wi-Fi (registered trademark). The TCU 72 communicates with the maintenance server 200 via the communication network 500.

The charging lid opener 84 opens the charging lid 83 which opens or closes the charging port 82, to connectably expose the charging port 82. The charger 81 charges the battery 80 with electric power supplied from the nearest charging station 300 via the charging plug 301 connected to the charging port 82.

The CPU 20 executes a control program for the electric vehicle 1 stored in a memory 40, to function as a vehicle non-use state recognition unit 21, a battery remaining amount recognition unit 22, a battery maintenance request unit 23, an electronic key use recognition unit 24, a traveling history recording unit 25, a charging station search unit 26, a charging station reach recognition unit 27, an electric vehicle return recognition unit 28, and an electronic key enabled service execution unit 29.

The memory 40 stores vehicle ID information 42 and electronic key information 43 in addition to a control program 41. The vehicle ID information 42 includes a vehicle ID for network communication (an IP address, etc.) used when the TCU 72 in the communication unit 70 communicates with the maintenance server 200 and a vehicle ID for short range wireless communication (an authentication code conforming to BR/EDR, BLE, or NFC, an MAC (media access control) address for Wi-Fi connection, etc.) used when the short range wireless communication unit 71 communicates with the user communication terminal 100 and the staff communication terminal 110. In the electronic key information 43, information about the electronic key Vk transmitted to the maintenance server 200 using the user information Pui and recorded in the user registration table 201 is recorded.

The vehicle non-use state recognition unit 21 recognizes a vehicle non-use state as a state where the electric vehicle 1 is parked in the parking lot Sp without being used based on the vehicle non-use period information Cuup received from the user communication terminal 100. The vehicle non-use state recognition unit 21 may recognize a vehicle non-use period and a vehicle non-use state by receiving information about an action plan of the user Pu registered in a schedule management application used in the user communication terminal 100 from the user communication terminal 100.

The battery remaining amount recognition unit 22 recognizes a remaining amount of the battery 80 based on a voltage of the battery 80 detected by the battery voltage sensor 55. The battery remaining amount recognition unit 22 may recognize the remaining amount of the battery 80 by integrating a current outputted from the battery 80.

The battery maintenance request unit 23 transmits, when the remaining amount of the battery 80 recognized by the battery remaining amount recognition unit 22 becomes the remaining amount threshold value or less, the charging request information Btc_R for requesting to perform a commissioned charging for the battery 80 to the maintenance server 200. The electronic key use recognition unit 24 recognizes that the electric vehicle 1 is in an electronic key use state where the commissioned staff Ps uses the staff communication terminal 110 to unlock the electric vehicle 1 with the electronic key Vk and the electric vehicle 1 is started with the electronic key Vk to be operating.

The traveling history recording unit 25 transmits to the maintenance server 200 the traveling history information Drr representing a traveling history of the electric vehicle 1 with the electronic key use recognition unit 24 recognizing that the electric vehicle 1 is in the electronic key use state. The charging station search unit 26 searches for the nearest charging station 300 as the charging station nearest from the electric vehicle 1 using the navigation unit 60.

The charging station reach recognition unit 27 recognizes that the electric vehicle 1 has reached the nearest charging station 300 using the navigation unit 60. The electric vehicle return recognition unit 28 recognizes that the electric vehicle 1, which has traveled to the nearest charging station 300 to charge the battery 80 by the service of commissioned charging, has returned to the original parking lot Sp using the navigation unit 60.

The electronic key enabled service execution unit 29 performs, when the electronic key use recognition unit 24 recognizes that the electric vehicle 1 is in the electronic key use state, a first service for supporting an operation of the electric vehicle 1 for the commissioned staff Ps and a second service for notifying the user Pu of a state of the electric vehicle 1.

The electronic key enabled service execution unit 29 performs the following processing (1-1) and (1-2) as the first service.

(1-1) The electronic key enabled service execution unit 29 performs a route guidance from the current position of the electric vehicle 1 to the nearest charging station 300 using the navigation unit 60.

(1-2) The electronic key enabled service execution unit 29 opens the charging lid 83 using the charging lid opener 84 when the charging station reach recognition unit 27 recognizes that the electric vehicle 1 has reached the nearest charging station 300.

The electronic key enabled service execution unit 29 performs the following processing (2-1), (2-2), and (2-3) as the second service.

(2-1) The electronic key enabled service execution unit 29 transmits information about the traveling history of the electric vehicle 1 recorded in the traveling history table 202 in the maintenance server 200 to the user communication terminal 100. The user Pu can confirm that the service of commissioned charging has been appropriately implemented by referring to the traveling history of the electric vehicle 1 using the user communication terminal 100.

(2-2) The electronic key enabled service execution unit 29 transmits, when the remaining amount of the battery 80 recognized by the battery remaining amount recognition unit 22 becomes not less than a second predetermined value larger than the remaining amount threshold value, the charging completion information Btcc for notifying completion of charging of the battery 80 to the user communication terminal 100 via the maintenance server 200.

(2-3) The electronic key enabled service execution unit 29 transmits, when the electric vehicle return recognition unit 28 confirms that the electric vehicle 1 in which the battery 80 has been charged by the service of commissioned charging has returned to the original parking lot Sp and the remaining amount of the battery 80 recognized by the battery remaining amount recognition unit 22 is not less than a third predetermined value larger than the battery remaining amount threshold value, the charging completion return information Btcf for notifying the completion of the charging of the battery 80 and the return of the electric vehicle 1 to the user communication terminal 100 via the maintenance server 200.

3. Processing for Service of Commissioned Charging

Then, a series of processing performed by the user communication terminal 100, the electric vehicle 1, the maintenance server 200, and the staff communication terminal 110 will be described according to a flowchart illustrated in FIG. 4 in the embodiment of the service of commissioned charging illustrated in FIG. 1.

Figure 4:
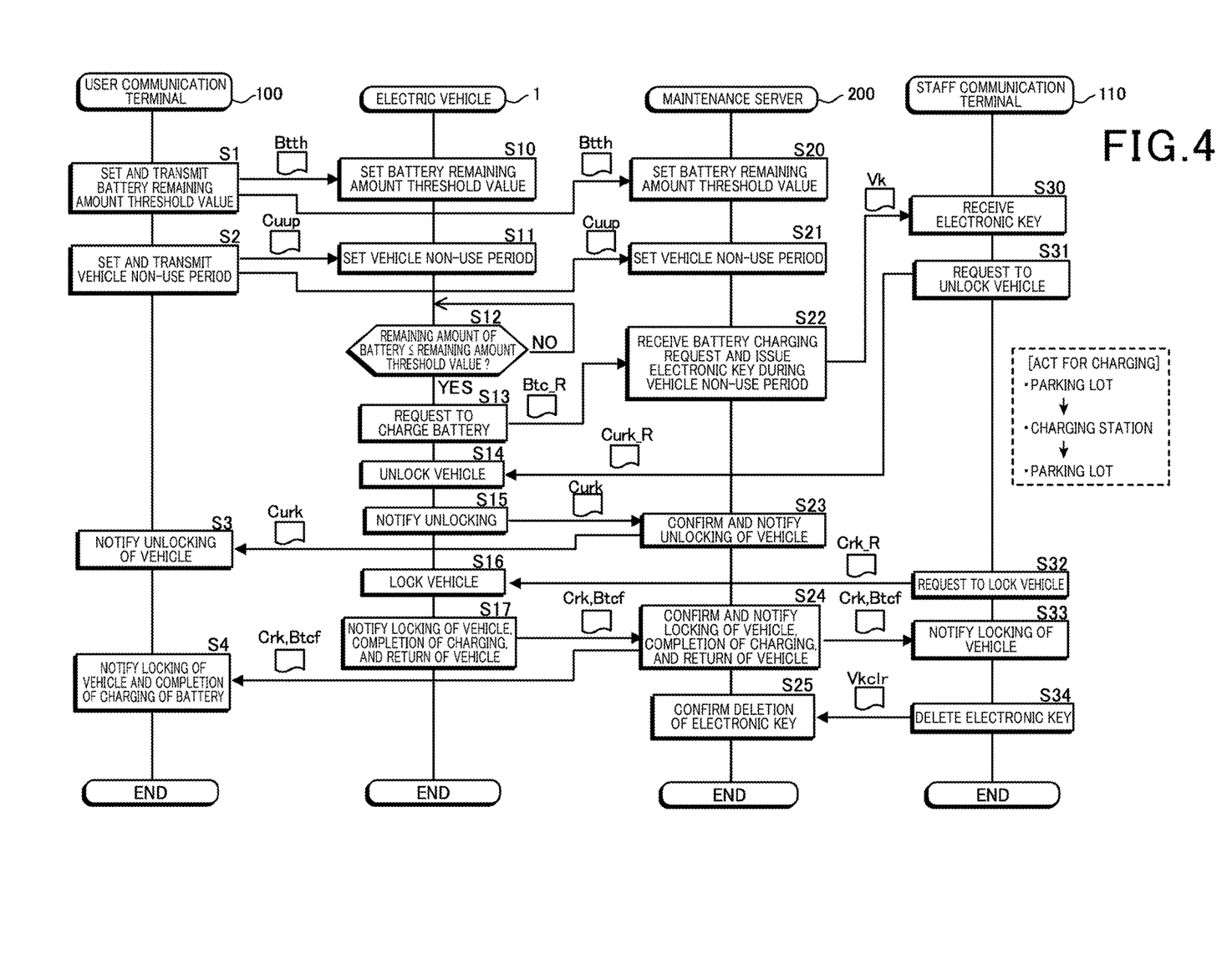
FIG. 4 is a flowchart of processing of a user communication terminal, an electric vehicle, a maintenance server, and a staff communication terminal in the service of commissioned battery charging.

In step S1 illustrated in FIG. 4, the user communication terminal 100 sets a remaining amount threshold value of the battery 80 in response to an operation of the user Pu, and transmits remaining amount threshold value information Btth representing the remaining amount threshold value to the electric vehicle 1 and the maintenance server 200. In step S10, the battery maintenance request unit 23 in the electric vehicle 1 stores the remaining amount threshold value in the memory 40. In step S20, the maintenance server 200 records the remaining amount threshold value in a corresponding portion of the user registration table 201.

In step S2, the user communication terminal 100 sets a vehicle non-use period in response to an operation of the user Pu, and transmits vehicle non-use period information Cuup representing the vehicle non-use period to the electric vehicle 1 and the maintenance server 200. In step S11, the vehicle non-use state recognition unit 21 in the electric vehicle 1 stores the vehicle non-use period recognized from the vehicle non-use period information Cuup in the memory 40. In step S21, the maintenance server 200 records the vehicle non-use period in a corresponding portion of the user registration table 201.

In step S12, the battery maintenance request unit 23 in the electric vehicle 1 determines whether or not a remaining amount of the battery 80 recognized by the battery remaining amount recognition unit 22 is the remaining amount threshold value or less. When the remaining amount of the battery 80 becomes the remaining amount threshold value or less, the processing proceeds to step S13.

In step S13, the battery maintenance request unit 23 transmits charging request information Btc_R for requesting to charge the battery 80 to the maintenance server 200. In step S22, the maintenance server 200 receives the charging request information Btc_R, and transmits the electronic key Vk to the staff communication terminal 110 (issues the electronic key Vk) in the vehicle non-use period.

In step S30, the staff communication terminal 110 receives the electronic key Vk, and stores the received electronic key Vk in a memory. In subsequent step S31, the staff communication terminal 110 transmits unlocking request information Curk_R for requesting to unlock the electric vehicle 1 with the electronic key Vk to the electric vehicle 1 in response to an operation of the commissioned staff Ps.

In step S14, the electronic key use recognition unit 24 in the electric vehicle 1 receives the unlocking request information Curk_R, and authenticates the electronic key Vk to unlock the electric vehicle 1 using the door lock mechanism 50. In subsequent step S15, the electronic key use recognition unit 24 transmits vehicle unlocking information Curk for notifying that the electric vehicle 1 has been unlocked to the maintenance server 200. In step S23, the maintenance server 200 receives the vehicle unlocking information Curk, and transmits the vehicle unlocking information Curk to the user communication terminal 100.

In step S3, the user communication terminal 100 receives the vehicle unlocking information Curk, and notifies the user Pu that the electric vehicle 1 has been unlocked by display on a display section (not illustrated) or output of a voice guidance from a speaker (not illustrated), for example.

Thus, the commissioned staff Ps who has unlocked the electric vehicle 1 drives the electric vehicle 1 to the nearest charging station 300, and charges the battery 80 in the electric vehicle 1 at the nearest charging station 300. When the charging of the battery 80 is completed, the commissioned staff Ps performs an operation for locking the electric vehicle 1 using the staff communication terminal 110.

In step S32, the staff communication terminal 110 transmits vehicle locking request information Crk_R for requesting to lock the electric vehicle 1 with the electronic key Vk to the electric vehicle 1 in response to the operation for locking the electric vehicle 1 by the commissioned staff Ps. In step S16, the electronic key use recognition unit 24 in the electric vehicle 1 receives the vehicle locking request information Crk_R, and authenticates the electronic key Vk to lock the electric vehicle 1 using the door lock mechanism 50.

In subsequent step S17, the electronic key enabled service execution unit 29 transmits to the maintenance server 200 vehicle locking information Crk for notifying that the electric vehicle 1 has been locked and charging completion return information Btcf for notifying that the charging of the battery 80 has been completed and the electric vehicle 1 has returned to the parking lot Sp. In step S24, the maintenance server 200 receives the vehicle locking information Crk and the charging completion return information Btcf, and transmits the vehicle locking information Crk and the charging completion return information Btcf to the user communication terminal 100 and the staff communication terminal 110.

The user communication terminal 100 notifies, when it receives the vehicle locking information Crk and the charging completion return information Btcf in step S4, the user Pu that the charging of the battery 80 has been completed, the electric vehicle 1 has returned to the parking lot Sp, and the electric vehicle 1 has been locked by display on the display section or output of a voice guidance from the speaker, for example.

In step S33, the staff communication terminal 110 receives the vehicle locking information Crk and the charging completion return information Btcf from the maintenance server 200. In step S34, the staff communication terminal 110 deletes the electronic key Vk stored in the memory, and transmits to the maintenance server 200 electronic key deletion information Vkclr for notifying that the deletion of the electronic key Vk has been completed. In step S25, the maintenance server 200 receives the electronic key deletion information Vkclr, to confirm that the electronic key Vk has been deleted from the staff communication terminal 110 and complete the service of commissioned charging.

As another configuration, the staff communication terminal 110 may transmit, when it has deleted the electronic key Vk stored in the memory, the electronic key deletion information Vkclr to the maintenance server 200 and the user communication terminal 100. Alternatively, the maintenance server 200 may notify the user communication terminal 100 that the electronic key Vk has been deleted from the staff communication terminal 110 after receiving the electronic key deletion information Vkclr transmitted from the staff communication terminal 110 and confirming that the electronic key Vk has been deleted from the staff communication terminal 110.

4. Other Embodiments

In the above-described embodiment, the electronic key Vk is transmitted to the staff communication terminal 110 so that the commissioned staff Ps can unlock and lock the electric vehicle 1 using the electronic key Vk. As another configuration, unlocking request information and locking request information may be transmitted from the maintenance server 200 or the user communication terminal 100 to the electric vehicle 1 without the electronic key Vk being transmitted to unlock and lock the electric vehicle 1.

Although the electric vehicle support system according to the present invention is configured by the ECU 10 in the electric vehicle 1 in the above-described embodiment, the electric vehicle support system may be configured by the maintenance server 200. In this case, the maintenance server 200 determines a charging timing of the battery 80 based on information transmitted from the electric vehicle 1, to start a service of commissioned charging of the battery 80. Alternatively, the electric vehicle 1 and the maintenance server 200 may constitute the electric vehicle support system according to the present invention. In this case, the electric vehicle 1 and the maintenance server 200 share the configuration of the electric vehicle support system.

In the above-described embodiment, when the battery 80 in the electric vehicle 1 is charged by the service of commissioned charging using the electronic key Vk, the electronic key enabled service execution unit 29 executes the first service for supporting the driving or the operation of the electric vehicle 1 for the commissioned staff Ps and the second service for notifying the user Pu of the state of the electric vehicle 1. As another configuration, the first service and the second service may not be executed or only either one of the first service and the second service may be executed.

Although the electric vehicle 1 transmits the charging request information Btc_R to the staff communication terminal 110 via the maintenance server 200 in the above-described embodiment, the electric vehicle 1 may transmit the charging request information Btc_R to the staff communication terminal 110 without via the maintenance server 200. In this case, the staff communication terminal also functions as the maintenance reception terminal according to the present invention.

Although the electric vehicle 1 transmits the vehicle unlocking information Curk, the vehicle locking information Crk, the charging completion information Bcc, and the charging completion return information Bccf to the user communication terminal 100 or the staff communication terminal 110 via the maintenance server 200 in the above-described embodiment, the electric vehicle 1 may transmit the information to the user communication terminal 100 or the staff communication terminal 110 without via the maintenance server 200.

Although the system for providing the service of commissioned charging for the battery 80 in the electric vehicle has been described in the above-described embodiment, the present invention is also applicable to a case where the electric vehicle is a motorcycle and replacement of a battery is commissioned, for example. In this case, when a remaining amount of the battery in the electric vehicle becomes a remaining amount threshold value or less, battery replacement request information for requesting to replace the battery (corresponding to the remaining amount recovery request information in the present invention) is transmitted to the maintenance server 200. The commissioned staff Ps delivers a battery for replacement to a parking lot of the electric vehicle. The battery may be replaced by the commissioned staff Ps or may be replaced by the user Pu.

Figure 2:
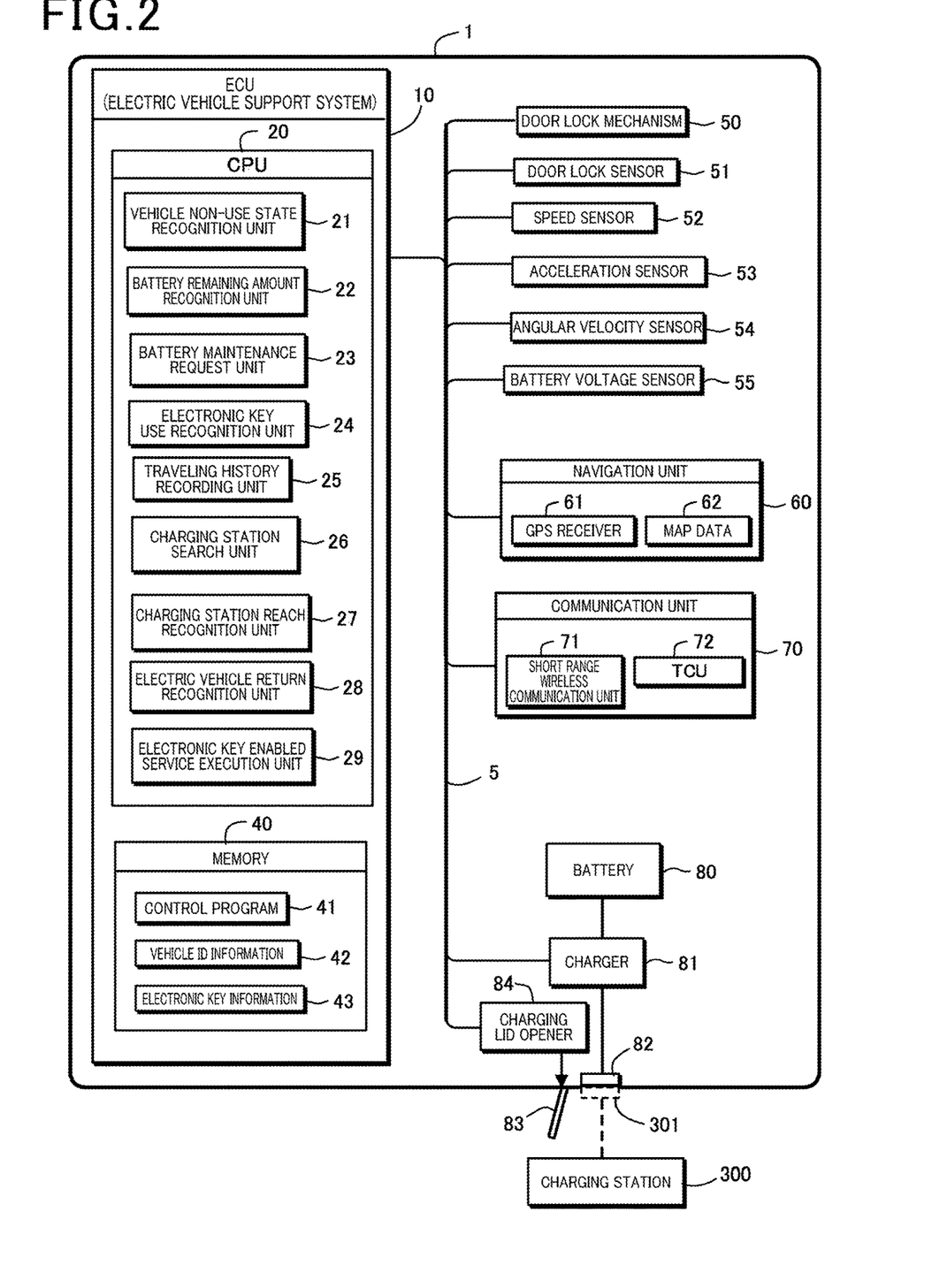
FIG. 2 is a control block diagram of the electric vehicle.

FIG. 2 is a schematic view illustrating a functional configuration of the electric vehicle support system with the functional configuration sectionalized depending on main processing contents to facilitate understanding of the present invention. The electric vehicle support system may be configured by another sectionalization. Processing of each of components may be performed by one hardware unit, or may be performed by a plurality of hardware units. Processing of each of the components illustrated in FIG. 4 may be performed by one program, or may be performed by a plurality of programs.

REFERENCE SIGNS LIST

1 . . . Electric vehicle, 10 . . . ECU (including a function of an electric vehicle support system), 20 . . . CPU, 21 . . . Vehicle non-use state recognition unit, 22 . . . Battery remaining amount recognition unit, 23 . . . Battery maintenance request unit, 24 . . . Electronic key use recognition unit, 25 . . . Traveling history recording unit, 26 . . . Charging station search unit, 27 . . . Charging station reach recognition unit, 28 . . . Electric vehicle return recognition unit, 29 . . . Electronic key enabled service execution unit, 40 . . . Memory, 41 . . . Control program, 42 . . . Vehicle ID information, 43 . . . Electronic key information, 80 . . . Battery, 81 . . . Charger, 82 . . . Charging port, 100 . . . User communication terminal, 110 . . . Staff communication terminal, 200 . . . Maintenance server, 201 . . . User registration table, 202 . . . Traveling history table, 300 . . . Nearest charging station, Pu . . . User, and Ps . . . Commissioned staff.

What is claimed is:

1. An electric vehicle support system comprising a CPU, the CPU comprising:
    a vehicle non-use state recognition unit which recognizes that an electric vehicle is in non-use state;
    a battery remaining amount recognition unit which recognizes a remaining amount of a battery loaded into the electric vehicle;
    a battery maintenance request unit which transmits, when the vehicle non-use state recognition unit recognizes that the electric vehicle is in non-use state, remaining amount recovery request information for requesting to recover the remaining amount of the battery to a maintenance reception communication terminal which receives a maintenance of the battery when the battery remaining amount recognition unit recognizes that the remaining amount of the battery is a first predetermined value or less;
    an electronic key use recognition unit which recognizes that the electric vehicle is in an electronic key use state where the electric vehicle is started by using the electronic key and the electric vehicle is operating, and
    an electronic key enabled service execution unit which executes at least either one of a first service for supporting an operation of the electric vehicle for a commissioned staff who is operating the electric vehicle and a second service for notifying a user of the electric vehicle of a state of the electric vehicle when the electronic key use recognition unit recognizes that the electric vehicle is in the electronic key use state; and
    an electric vehicle return recognition unit which recognizes that the electric vehicle starts to travel in the electronic key use state and then returns to a place where the traveling is started,
    wherein the electronic key enabled service execution unit performs processing for transmitting, when the electric vehicle return recognition unit recognizes that the electric vehicle starts to travel in the electronic key use state and then returns to the place where the traveling is started and the battery remaining amount recognition unit recognizes that a remaining amount of the battery is not less than a third predetermined value larger than the first predetermined value, charging completion return information for notifying completion of charging of the battery and the return of the electric vehicle to a communication terminal of the user of the electric vehicle as the second service.

2. The electric vehicle support system according to claim 1, wherein the battery maintenance request unit transmits an electronic key which enables an operation of the electric vehicle to the maintenance reception communication terminal when transmitting the remaining amount recovery request information to the maintenance reception communication terminal.

3. The electric vehicle support system according to claim 1, wherein the CPU further comprises
    a traveling history recording unit which records a traveling history of the electric vehicle when the electronic key use recognition unit recognizes that the electric vehicle is in the electronic key use state,
    wherein the electronic key enabled service execution unit performs processing for transmitting information about the traveling history of the electric vehicle in the electronic key use state recorded by the traveling history recording unit to a communication terminal of the user of the electric vehicle as the second service.

4. The electric vehicle support system according to claim 1, wherein the CPU further comprises
    a charging station search unit which searches for a nearest charging station as a charging station nearest from a current position of the electric vehicle,
    wherein the electronic key enabled service execution unit performs a route guidance to the nearest charging station searched for by the charging station search unit as the first service.

5. The electric vehicle support system according to claim 1, wherein the CPU further comprises
    a charging station reach recognition unit which recognizes that the electric vehicle has reached a charging station,
    wherein the electronic key enabled service execution unit performs processing for exposing, when the charging station reach recognition unit recognizes that the electric vehicle has reached the charging station, a charging port of the electric vehicle as the first service.

6. The electric vehicle support system according to claim 1, wherein the electronic key enabled service execution unit performs processing for transmitting, when the battery remaining amount recognition unit recognizes that the remaining amount of the battery is not less than a second predetermined value larger than the first predetermined value, charging completion information for notifying completion of charging of the battery to a communication terminal of the user of the electric vehicle as the second service.

* * * * *